United States Patent
Ruiz et al.

(10) Patent No.: US 9,866,110 B2
(45) Date of Patent: Jan. 9, 2018

(54) DC-DC SWITCHED CAPACITOR VOLTAGE CONVERTER WITH SERIES AND PARALLEL SWITCHED CAPACITORS DURING DISCHARGE

(71) Applicant: Analog Devices Global, Hamilton (BM)

(72) Inventors: Miguel A. Ruiz, Riba-Roja de Turia (ES); Jose Tejada Gomez, Valencia (ES)

(73) Assignee: Analog Devices Global, Hamilton (BM)

( * ) Notice: Subject to any disclaimer, the term of this patent is extended or adjusted under 35 U.S.C. 154(b) by 49 days.

(21) Appl. No.: 14/469,975

(22) Filed: Aug. 27, 2014

(65) Prior Publication Data

US 2016/0062378 A1  Mar. 3, 2016

(51) Int. Cl.
*H02M 3/07*  (2006.01)
*G05F 1/618*  (2006.01)

(52) U.S. Cl.
CPC .............. *H02M 3/07* (2013.01); *G05F 1/618* (2013.01)

(58) Field of Classification Search
CPC .......... H02M 3/07; H02M 3/073; H02M 7/10; H02M 7/103; H02M 7/106; H02M 3/06; H02M 2003/071; H02M 2003/072; H02M 2003/077; H02J 7/0024; G11C 5/145
USPC .......................................... 307/110; 327/536
See application file for complete search history.

(56) References Cited

U.S. PATENT DOCUMENTS

| | | | |
|---|---|---|---|
| 6,198,645 B1* | 3/2001 | Kotowski | H02M 3/07 307/110 |
| 7,239,194 B2* | 7/2007 | Azrai | H01L 23/50 257/298 |
| 8,085,095 B2 | 12/2011 | Young | |
| 8,817,501 B1* | 8/2014 | Low | H02M 3/07 363/59 |
| 2005/0030771 A1* | 2/2005 | Conte | H02M 3/073 363/59 |
| 2010/0253154 A1* | 10/2010 | Yeates | H02M 3/07 307/110 |
| 2012/0147979 A1* | 6/2012 | Best | G06F 13/4072 375/259 |
| 2013/0058141 A1 | 3/2013 | Oraw et al. | |
| 2013/0106380 A1* | 5/2013 | Marsili | H02M 3/158 323/283 |
| 2015/0263612 A1* | 9/2015 | Wu | H02M 3/07 323/312 |

OTHER PUBLICATIONS

"Chapter 9: Power Management", 98 pgs.
(Continued)

*Primary Examiner* — Gary L Laxton
*Assistant Examiner* — Kyle J Moody
(74) *Attorney, Agent, or Firm* — Schwegman Lundberg & Woessner, P.A.

(57) ABSTRACT

A switched capacitor voltage converter is provided that includes an array of switches configured to alternately switch multiple capacitors between a charge configuration in which the multiple capacitors are coupled in series with each other and in parallel with the source voltage and a discharge configuration in which a first set of capacitors having n capacitors are coupled in parallel with each other and in series with the load and a second set of capacitors having m capacitors coupled in parallel with the load.

17 Claims, 14 Drawing Sheets

(56) References Cited

OTHER PUBLICATIONS

Baba, David, "Benefits of a multiphase buck converter", (2012), 8-15.
Dildine, Bob, "Buck Converter Basics", Bob Dildine, W6SFH—2321 Sycamore Ave, Santa Rosa, CA 95404 w6sfh@sonic.net, (Jan. 1, 2013), 7-10.
Gouni, Sudhir Reddy, "Fully Integrated Switched Capacitor Buck Converter With High Efficiency and Low Output Ripple", A thesis submitted to the Graduate School in partial fulllment of the requirements for the degree Master of Sciences, Engineering Specialization in: Electrical Engineering—New Mexico State University—Las Cruces, New Mexico—Nov. 2012, (Nov. 1, 2012), 91 pgs.
Huang, Wenkang, et al., "A Scalable Multiphase Buck Converter with Average Current Share Bus", International Rectifier, Rhode Island IC Design Center 200 Circuit Drive, North Kingstown, RI 02852, U.S.A., (2003), 1-7.
Ma, Mengzhe, "Design of High Efficiency Step-Down Switched Capacitor DC/DC Converter", An Abstract of the Thesis of Mengzhe Ma for the degree of Master of Science in Electrical and Computer Engineering presented on May 21, 2003., (May 21, 2003), 71 pgs.
Makowski, Marek S., "Performance Limits of Switched-Capacitor DC-DC Converters", (1995), 1215-1221.
Marasco, Ken, "How to Apply DC-to-DC Step-Down (Buck) Regulators Successfully", Analog Dialogue 45-06 Back Burner, Jun. 2011—www.analog.com/analogdialogue, (Jun. 1, 2011), 4 pgs.
Meeks, Daniel, "Loop Stability Analysis of Voltage Mode Buck Regulator With Different Output Capacitor Types—Continuous and Discontinuous Modes", (2008), 1-36.
Oota, Ichirou, et al., "A General Method for Deriving Output Resistances Serial Fixed Type Switched-Capacitor Po wer Supplies", (2000), III-503-III-506.
Raut, Snehal, "Semi-custom VLSI Design and Realization of DC-DC Converters in UMC90", M.Sc. Thesis, (2009), 75 pgs.
Seeman, Michael Douglas, "A Design Methodology for Switched-Capacitor DC-DC Converters", Electrical Engineering and Computer Sciences—University of California at Berkeley—Technical Report No. UCB/EECS-2009-78 http://www.eecs.berkeley.edu/Pubs/TechRpts/2009/EECS-2009-78.html May 21, 2009, (May 21, 2009), 249 pgs.
Seeman, Michael D., et al., "Analysis and Optimization of Switched-Capacitor DC-DC Converters", (2008), 841-851.

\* cited by examiner

|   | n |   |   |   |   |   |   |   |   |   |   |   |   |   |   |
|---|---|---|---|---|---|---|---|---|---|---|---|---|---|---|---|
| m | 2 | 3 | 4 | 5 | 6 | 7 | 8 | 9 | 10 | 11 | 12 | 13 | 14 | 15 | 16 |
| 0 | 0.500 | 0.667 | 0.750 | 0.800 | 0.833 | 0.857 | 0.875 | 0.889 | 0.900 | 0.909 | 0.917 | 0.923 | 0.929 | 0.933 | 0.938 |
| 1 | 0.333 | 0.500 | 0.600 | 0.667 | 0.714 | 0.750 | 0.778 | 0.800 | 0.818 | 0.833 | 0.846 | 0.857 | 0.867 | 0.875 | 0.882 |
| 2 | 0.250 | 0.400 | 0.500 | 0.571 | 0.625 | 0.667 | 0.700 | 0.727 | 0.750 | 0.769 | 0.786 | 0.800 | 0.813 | 0.824 | 0.833 |
| 3 | 0.200 | 0.333 | 0.429 | 0.500 | 0.556 | 0.600 | 0.636 | 0.667 | 0.692 | 0.714 | 0.733 | 0.750 | 0.765 | 0.778 | 0.789 |
| 4 | 0.167 | 0.286 | 0.375 | 0.444 | 0.500 | 0.545 | 0.583 | 0.615 | 0.643 | 0.667 | 0.688 | 0.706 | 0.722 | 0.737 | 0.750 |
| 5 | 0.167 | 0.250 | 0.333 | 0.400 | 0.455 | 0.500 | 0.538 | 0.571 | 0.600 | 0.625 | 0.647 | 0.667 | 0.684 | 0.700 | 0.714 |
| 6 | 0.125 | 0.222 | 0.300 | 0.364 | 0.417 | 0.462 | 0.500 | 0.533 | 0.563 | 0.588 | 0.611 | 0.632 | 0.650 | 0.667 | 0.682 |
| 7 | 0.111 | 0.200 | 0.273 | 0.333 | 0.385 | 0.429 | 0.467 | 0.500 | 0.529 | 0.556 | 0.579 | 0.600 | 0.619 | 0.636 | 0.652 |
| 8 | 0.100 | 0.182 | 0.250 | 0.308 | 0.357 | 0.400 | 0.438 | 0.471 | 0.500 | 0.526 | 0.550 | 0.571 | 0.591 | 0.609 | 0.625 |
| 9 | 0.091 | 0.167 | 0.231 | 0.286 | 0.333 | 0.375 | 0.412 | 0.444 | 0.474 | 0.500 | 0.524 | 0.545 | 0.565 | 0.583 | 0.600 |
| 10 | 0.083 | 0.154 | 0.214 | 0.267 | 0.313 | 0.353 | 0.389 | 0.421 | 0.450 | 0.476 | 0.500 | 0.522 | 0.542 | 0.560 | 0.577 |
| 11 | 0.077 | 0.143 | 0.200 | 0.250 | 0.294 | 0.333 | 0.368 | 0.400 | 0.429 | 0.455 | 0.478 | 0.500 | 0.520 | 0.538 | 0.556 |
| 12 | 0.071 | 0.133 | 0.188 | 0.235 | 0.278 | 0.316 | 0.350 | 0.381 | 0.409 | 0.435 | 0.458 | 0.480 | 0.500 | 0.519 | 0.536 |
| 13 | 0.067 | 0.125 | 0.176 | 0.222 | 0.263 | 0.300 | 0.333 | 0.364 | 0.391 | 0.417 | 0.440 | 0.462 | 0.481 | 0.500 | 0.517 |
| 14 | 0.063 | 0.118 | 0.167 | 0.211 | 0.250 | 0.286 | 0.318 | 0.348 | 0.375 | 0.400 | 0.423 | 0.444 | 0.464 | 0.483 | 0.500 |
| 15 | 0.059 | 0.111 | 0.158 | 0.200 | 0.238 | 0.273 | 0.304 | 0.333 | 0.360 | 0.385 | 0.407 | 0.429 | 0.448 | 0.467 | 0.484 |

*FIG. 4*

| Frequency | 64 | kHz |
|---|---|---|
| Unit capacitor | 27.5 | pF |
| Capacitor area | 0.32 | mm$^2$ |
| Output Impedance | 35 | k$\Omega$ |
| Minimum gain | 0.313 | |
| Maximum gain | 0.938 | |
| Gain step | 0.062 | |
| Over voltage during Phase I | 300 | mV |
| Under voltage during Phase I | -300 | mV |

*FIG. 5*

| Gain | 15 | 14 | 13 | 12 | 11 | 10 | 9 | 8 | 7 | 6 | 5 | 4 | 3 | 2 | 1 | 0 | Volts | | |
|---|---|---|---|---|---|---|---|---|---|---|---|---|---|---|---|---|---|---|---|
| | | | | | | | | | | | | | | | | | Min | Max | Max net |
| 0.313 | 1 | 0 | 1 | 0 | 0 | 0 | 1 | 0 | 0 | 1 | 0 | 0 | 0 | 1 | 0 | 1 | -0.22 | 4.32 | 5 |
| 0.375 | 1 | 0 | 1 | 0 | 0 | 1 | 1 | 0 | 1 | 0 | 1 | 0 | 0 | 1 | 0 | 1 | 0.00 | 7.92 | 15 |
| 0.438 | 1 | 0 | 1 | 0 | 1 | 0 | 1 | 0 | 0 | 1 | 0 | 1 | 0 | 1 | 0 | 1 | 0.15 | 9.91 | 15 |
| 0.500 | 1 | 0 | 1 | 0 | 1 | 0 | 1 | 1 | 0 | 1 | 0 | 1 | 0 | 1 | 0 | 1 | 0.00 | 9.48 | 7 |
| 0.563 | 1 | 0 | 1 | 1 | 0 | 1 | 1 | 0 | 0 | 1 | 1 | 0 | 1 | 1 | 0 | 1 | -0.24 | 9.15 | 13 |
| 0.625 | 1 | 1 | 1 | 0 | 1 | 0 | 1 | 0 | 1 | 1 | 0 | 1 | 0 | 1 | 1 | 1 | -0.22 | 8.89 | 2 |
| 0.688 | 1 | 1 | 1 | 0 | 1 | 0 | 1 | 1 | 0 | 1 | 1 | 0 | 1 | 1 | 1 | 1 | -0.16 | 8.67 | 15 |
| 0.750 | 1 | 1 | 1 | 1 | 0 | 1 | 1 | 1 | 1 | 0 | 1 | 1 | 0 | 1 | 1 | 1 | 0.52 | 8.49 | 15 |
| 0.813 | 1 | 1 | 1 | 1 | 1 | 0 | 1 | 1 | 1 | 0 | 1 | 1 | 1 | 1 | 1 | 1 | 0.52 | 8.34 | 15 |
| 0.875 | 1 | 1 | 1 | 1 | 1 | 1 | 1 | 1 | 1 | 1 | 1 | 0 | 1 | 1 | 1 | 1 | 0.52 | 8.21 | 15 |
| 0.938 | 1 | 1 | 1 | 1 | 1 | 1 | 1 | 1 | 1 | 1 | 1 | 1 | 1 | 1 | 1 | 1 | 0.51 | 8.21 | 15 |

*FIG. 6*

US 9,866,110 B2

DC-DC SWITCHED CAPACITOR VOLTAGE CONVERTER WITH SERIES AND PARALLEL SWITCHED CAPACITORS DURING DISCHARGE

BACKGROUND

A DC-DC converter accepts a DC voltage and produces a different DC voltage. A DC-DC voltage converter that provides a DC output voltage that is less than a DC input voltage is sometimes referred to as a "buck" voltage converter. A switched-capacitor voltage converter is a power converter that uses capacitors and switches to perform voltage conversion using a charge transfer method. A multiple gain switched capacitor voltage converter can be used to select from among different gains to use to convert an input voltage provided by a voltage source such as a battery, to an output voltage level required by an output load.

In a battery powered system, a battery's voltage typically drops as the battery is discharged during its operational lifetime. At the beginning of a battery's operational life, the battery voltage may be higher than a desired load voltage level, so that a step-down converter may be used to provide the power supply voltage. Toward the end of the battery's life, the battery voltage may be less than a desired load voltage level, so that a step-up converter may be used to provide the power supply voltage level. A multiple gain switched capacitor voltage converter may be used, for example, when there is a need to vary voltage gain in order to maintain a desired load voltage level despite changes in a battery's voltage level over the course of the battery's operational life.

Often, a battery acts as a voltage source used to power system that includes a variety of components, referred to collectively as a "load", such as a processor, DRAM and Flash storage, for example. To conserve power, some systems employ a low power mode of operation in which certain components such as DRAM and Flash are shut off and other components such as a processor, for example, remain turned on, but operate in a low power mode having a reduced voltage level and a reduced load current level. The reduced voltage and the load current are lower than voltage and current levels during normal operation mode levels. In the past, DC-DC switched capacitor voltage converters have been used during low power mode to convert a battery voltage level to a low power voltage level, while also minimizing battery 'leakage' current during low power mode operation.

FIGS. 1A-1B are illustrative drawings representing configuration of capacitors of a prior switched capacitor voltage converter coupled between a battery voltage and a load circuit during a charge phase (FIG. 1A) and a discharge phase (FIG. 1B). low power mode operation, the converter converts a battery voltage level, $V_{Bat}$, to a low power voltage level applied to the load, e.g., to a system in a low power mode. More specifically, the converter switches between the charge and discharge phases at a prescribed frequency. Referring to FIG. 1A, during the charge phase, sometimes referred to as 'phase I', N switched capacitors are coupled between the battery voltage, $V_{Bat}$, and ground. During the charge phase, a low power voltage level and load current $I_L$ are applied to the load using a reservoir capacitor $C_{Res}$, which is connected in parallel with the load, which is disconnected from the N switched capacitors. Referring to FIG. 1B, during the discharge phase, sometimes referred to as phase II, the N switched capacitors are coupled in parallel with each other and in series with $C_{Res}$. The discharge of the voltages on the N switched capacitors recharges voltage on $C_{Res}$. Switches $R_{SW}$ typically include FET devices that are used to switch the switched capacitors between phase I and phase II, and that act as resistive elements during phase II.

In the prior converter of FIGS. 1A-1B, different numbers of switched capacitors can be used to achieve different voltage gains. For example, in some earlier converters, use of N=2 switched capacitors during the charge and discharge phases results in a gain of ½; use of N=3 switched capacitors during the charge and discharge phases results in a gain of ⅔; and use of N=4 switched capacitors during the charge and discharge phases results in a gain of ¾. Thus, for example, in some prior converters, when converting using N=2 switched capacitors, the converter does not use one-third of the capacitor area.

SUMMARY

In one aspect, a switched capacitor voltage converter is provided to convert a DC voltage source level to a DC load voltage level. An array of switches configured to alternately switch multiple capacitors between a charge configuration in which the multiple capacitors are coupled in series with each other and in parallel with the source voltage and a discharge configuration in which a first set of capacitors having n capacitors are coupled in parallel with each other and in series with the load and a second set of capacitors having m capacitors coupled in parallel with the load.

In another aspect, a method is provided to configure switched multiple capacitors to convert a DC voltage source level to a DC load voltage level. An array of multiple capacitors is alternately switched between a charge configuration in which the multiple capacitors are coupled in series with each other and in parallel with the source voltage and a discharge configuration in which a first set of capacitors having n capacitors are coupled in parallel with each other and in series with the load and a second set of capacitors having m capacitors coupled in parallel with the load.

BRIEF DESCRIPTION OF THE DRAWINGS

FIG. 4 is an illustrative table that shows gain for each n set/m set combination of switched capacitors in an example implementation in accordance with some embodiments.

FIG. 5 is an illustrative table showing design parameters for a converter implementation using the switched capacitors of FIG. 4 in accordance with some embodiments.

FIG. 6 is illustrative table showing switched capacitor sort order, for multiple different gains and corresponding minimum voltages and maximum voltages, for m+n switched capacitors of implementation of FIGS. 4-5 in accordance with some embodiments.

DESCRIPTION OF EMBODIMENTS

Figure 1A:
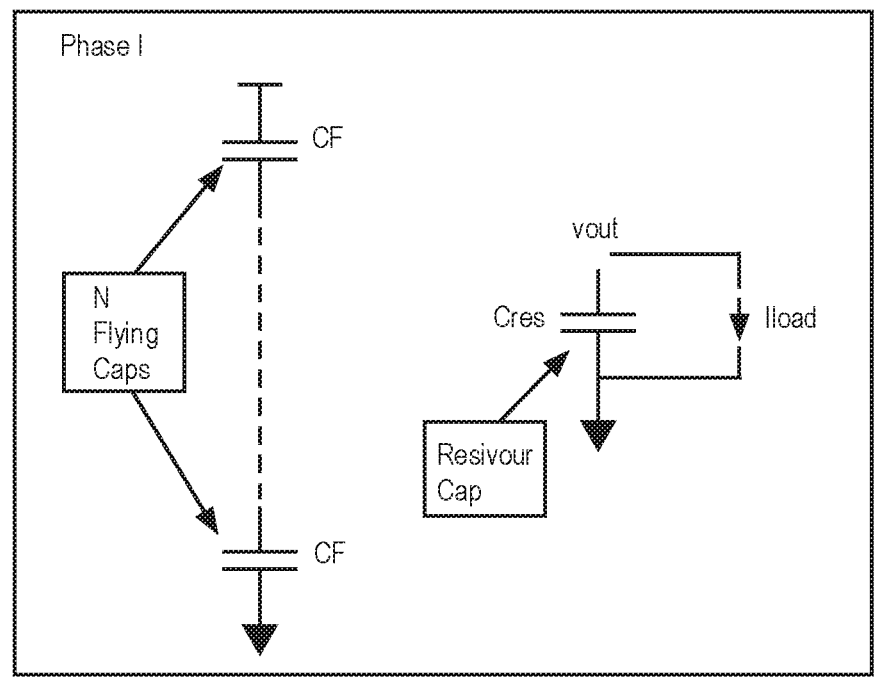
FIGS. 1A-1B are illustrative drawings representing configuration of capacitors of a prior switched capacitor voltage converter coupled between a battery voltage and a load circuit during a charge phase (FIG. 1A) and a discharge phase (FIG. 1B).

The following description is presented to enable any person skilled in the art to create and use a DC-DC voltage converter with series and parallel switched capacitors during discharge. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known data structures and processes are shown in block diagram form in order not to obscure the description of the invention with unnecessary detail. Identical reference numerals may be used to represent different views of the same item in different drawings. Flow diagrams in drawings referenced below are used to represent processes. A machine such as a controller is configured to perform these processes. The flow diagrams include modules that represent the configuration of a controller to perform the acts described with reference to these modules. Thus, the present invention is not intended to be limited to the embodiments shown, but is to be accorded the widest scope consistent with the principles and features disclosed herein.

Overview

Figure 2A:
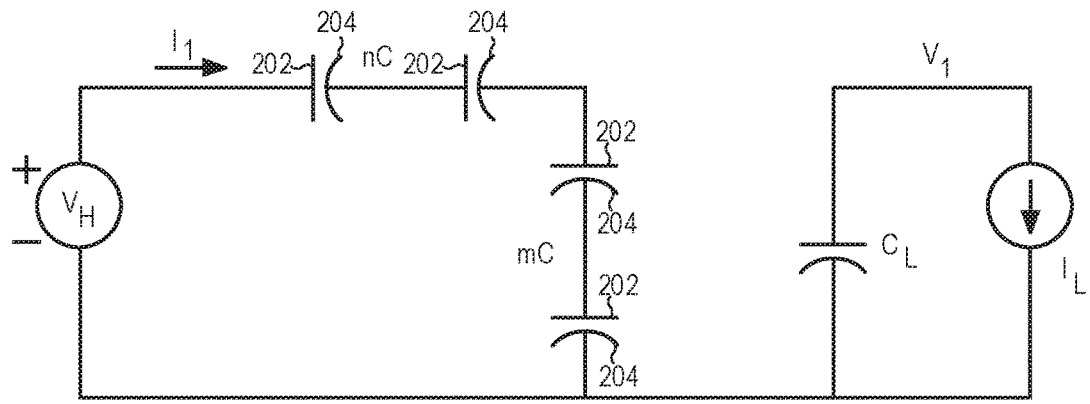
FIGS. 2A-2B are an illustrative drawings representing configuration of switched capacitors of a DC-DC switched capacitor voltage converter coupled between a battery voltage and a Load during a charge phase (FIG. 2A) and a discharge phase (FIG. 2B) in accordance with some embodiments.
Figure 2B:
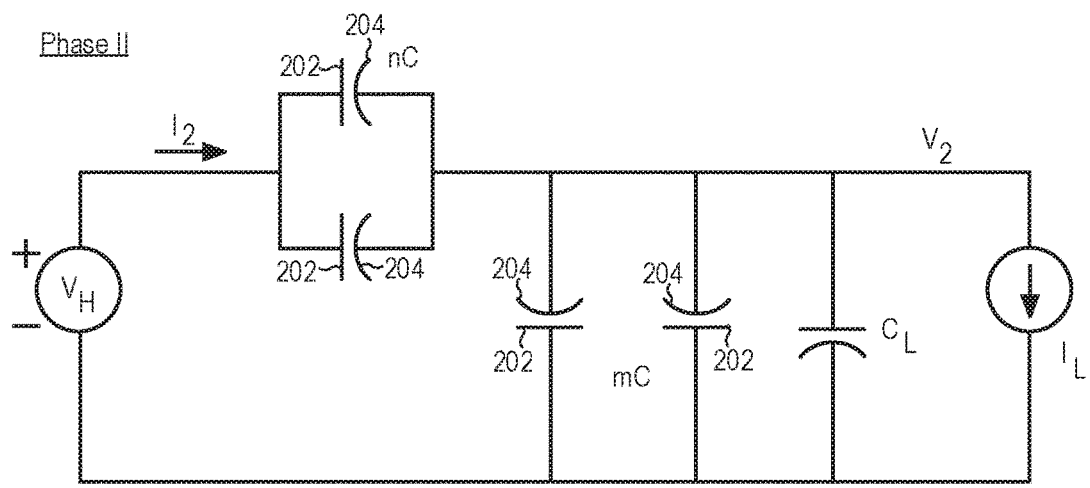

FIGS. 2A-2B are an illustrative drawings representing configuration of switched capacitors of a DC-DC switched capacitor voltage converter coupled between a battery voltage and a Load during a charge phase (FIG. 2A) and a discharge phase (FIG. 2B) in accordance with some embodiments. FIG. 2A shows the switched capacitors nC and mC in a charge configuration in which they are charged by a battery voltage $V_H$. FIG. 2B shows the switched capacitors nC and mC in a discharge configuration in which their discharge charges a reservoir capacitor $C_L$. The converter includes multiple capacitors that are allocated into a first set and a second set. In accordance with some embodiments the first set may be an "n set" and the second set may be an "m set".

More specifically, in accordance with some embodiments, the converter includes n+m switched capacitors. As explained more fully below, an n set containing n switched capacitors act in an 'n-role' and an m set containing m switched capacitors act in an 'm-role'. The number of switched capacitors in the n set and the number of switched capacitors in the m set is varied to vary gain across the converter. Referring to FIG. 2A, during the charge phase when the m+n switched capacitors are coupled in a charge configuration, both switched capacitors selected to be in the n set and switched capacitors selected to be in the m set are coupled in series between the battery voltage, $V_{Bat}$, and ground. That is, both the switched capacitors in the n set and the switched capacitors in the m set are coupled in series between the battery voltage, $V_{Bat}$, and ground. During the charge phase, a low power voltage level and load current $I_L$ are applied to the Load using a reservoir capacitor $C_{Res}$, which is connected in parallel with the Load. During the charge phase, the n+m switched capacitors are decoupled from $C_{Res}$. Referring to FIG. 2B, during the discharge phase when the m+n switched capacitors are coupled in a discharge configuration, the n switched capacitors that are selected to be in the n set are coupled in parallel with each other and in series with $C_{Res}$, and the m switched capacitors selected to be in the m set are coupled in parallel with each other and with $C_{Res}$. During the discharge phase, the discharge of the voltages on the n switched capacitors in the n set and the m switched capacitors in the m set recharges voltage on $C_{Res}$.

As used herein the n-role refers to the configuration of n switched capacitors in parallel with each other and in series with $C_{Res}$ during the discharge phase. Each switched capacitor in the n set is configured through one or more switches to be coupled in parallel with each other switched capacitor acting in the n set and in series with $C_{Res}$ during the charge phase. As used herein, the m-role refers to the configuration of m switched capacitors that are coupled in parallel with each other and with $C_{Res}$ during the discharge phase. Each switched capacitor in the m set is configured through one or more switches to be coupled in parallel with each other switched capacitor in the m set and in parallel with $C_{Res}$ during the discharge phase. First plates of each of the m set and n set capacitors are labeled 202. Second plates of each of the m set and n set capacitors are labeled 204. In accordance with some embodiments, the switched capacitors in the m set are coupled, during the discharge phase, with their polarities reversed relative to their coupling during the charge phase.

Figure 3:
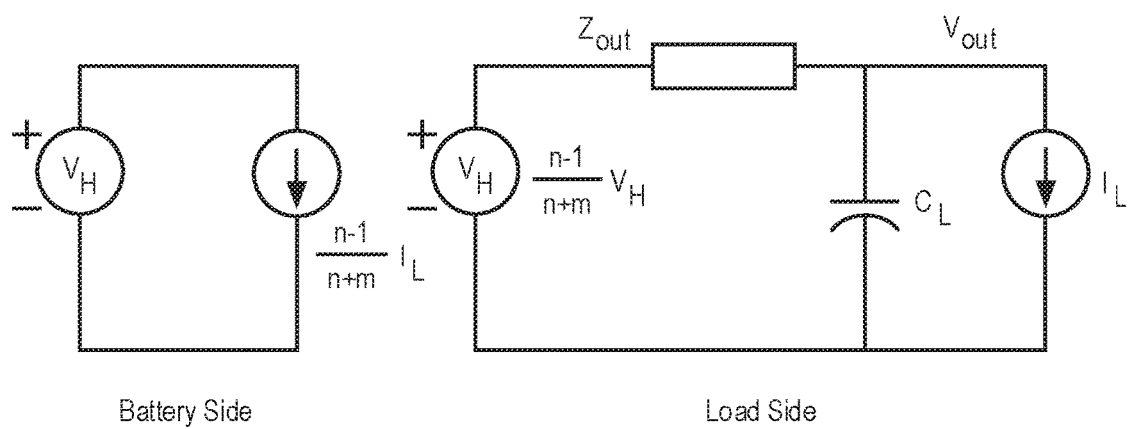
FIG. 3 is an illustrative drawing representing an equivalent circuit for the converter o FIGS. 2A-2B in accordance with some embodiments.

FIG. 3 is an illustrative drawing representing an equivalent circuit for the converter o FIGS. 2A-2B in accordance with some embodiments. A battery side includes the battery voltage $V_H$ and a battery current, $$\frac{n-1}{n+m}I_L.$$

A Load side includes the voltage, $$\frac{n-1}{n+m}V_H,$$

impedance ($Z_O$), the reservoir capacitor ($C_L$) and a Load current ($I_L$) source. Impedance ($Z_O$) coupled in parallel with the reservoir capacitance $C_L$ represents impedance due to the switched capacitors.

The number of switched capacitors in the n set and the number of switched capacitors in the m set is selectively varied with desired gain across the converter. However, in accordance with some embodiments, the same total number of switched capacitors, m+n, is used for each of multiple different gains. Moreover, in accordance with some embodiments, at least some of the polarities of the m switch capacitors selected to be in the m-role are reversed when coupled in parallel during the discharge phase.

Gain (A) is represented as follows, $$A = \frac{n+1}{n+m}$$

It is noted that gain varies substantially linearly with the number of switched capacitors in the n set.

Output impedance of the converter is represented as follows, $$Z_o = \frac{1}{fC(n+m)}$$

The value (f) represents the switching frequency of capacitor switching; the value (C) is the value of the individual switched capacitors. It is noted that the output impedance is independent of the gain setting. Thus, it is possible to vary the gain with the confidence that the voltage drop of the converter does not vary substantially with gain, which facilitates ease of regulation of the output voltage $V_{out}$.

It will be appreciated that an advantage of a configuration of an n set of switched capacitors and an m set of switched capacitors into n-roles and m-roles as described above is that substantially all the integrated circuit (IC) area used to implement capacitors contributes to improve the output impedance, since the number of n capacitors and m capacitors is added up to arrive at the output impedance $Z_0$. In accordance with some embodiments, once a given chip area is committed to act as a switched capacitor block, it can be advantageous to divide it up in many capacitor devices so as to produce many different gains. In general, the larger the number of different gains, the higher the efficiency achievable over the input voltage supply range. A limit to the number of gains arises, however, due to the fact that adding more switched capacitors necessitates more switches to control them.

Battery current used in charging the switch capacitors is represented as follows, $$I_{bat} = I_L \frac{n-1}{n+m}$$

The value $I_L$ represents the current through the Load that is driven by the converter. It is noted that $I_{bat}$ is less than $I_L$ by the gain factor (A). The battery current only depends on the load current, which means that no charge sharing occurs among the capacitors.

Output voltage ($V_{out}$) produced by the converter to drive the Load is represented as follows, $$V_{out} = V_H \frac{n-1}{n+m} - I_L Z_{out}$$

Efficiency (ε) of the converter is represented as follows, $$\varepsilon = 1 - \frac{I_L}{fCV_H(n-1)}$$

Example Switched Capacitor Parameters

FIG. 4 is an illustrative table that shows gain for each n set/m set combination of switched capacitors in an example implementation in accordance with some embodiments. FIG. 5 is an illustrative table showing design parameters for a converter implementation using the switched capacitors of FIG. 4 in accordance with some embodiments. FIG. 6 is illustrative table showing switched capacitor sort order, for multiple different gains and corresponding minimum voltages and maximum voltages, for m+n switched capacitors of implementation of FIGS. 4-5 in accordance with some embodiments.

Figure 1B:
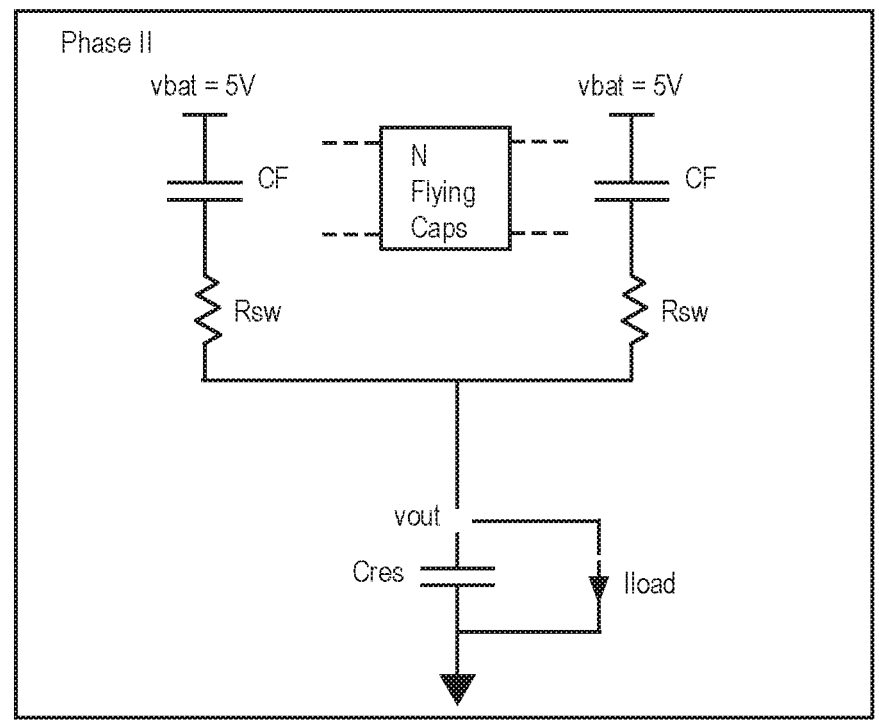

In the example implementation of FIGS. 4-6, m+n=16. The table in FIG. 4 shows a number of possible gains for n+m=16 in the example implementation. Gain values below 0.3 are not useful in the illustrative example, because 3.6V (the maximum supply) times 0.3 is 1.08V, which is the minimum output voltage. The example implementation implements the eleven (11) highlighted gains. It will be appreciated that this quite a large number of gains as compared with the three gains of the illustrative prior converter of FIG. 1, for example.

Referring to FIG. 5, the unit capacitor is chosen to be 27.5 pF, and the switching frequency is chosen to be 64 kHz. Thus, the output impedance is 35 k ohms. This means that, with the maximum load of 10 μA, the voltage drop in the converter is 0.35V. The voltage drop limits the battery range and is compensated by using higher gains. It will be appreciated that higher values of capacitance and frequency result in higher efficiency.

Switched Capacitor Series Connection Order

Referring to FIG. 6, an example capacitor "order" is shown that has been selected so as to avoid voltages across the switched capacitors that can adversely influence operation of switches used to switch the switched capacitors between different gain configurations involving different phase I and phase II configurations. In accordance with some embodiments, the switches, which are described more fully below, are implemented using field effect transistors (FETs). It will be appreciated that during phase I, when the switched capacitors are coupled in the charge configuration, the switched capacitors are connected in series carrying their previous voltage from the end of phase II, when the switched capacitors were coupled in the discharge configuration. This can create a reliability and functional problem because in the example implementation, the m set capacitors have inverted polarities during phase II, so that their voltage, when added up in series in phase I, can be negative and relatively large. For example, assuming the output voltage, $V_{out}$, is 1.2V and m=7, then all m capacitors in series add up to −8.4V at the beginning of phase I. With such a voltage, it is not possible to turn switches correctly on and off, and as a result, the overall converter circuit does not operate correctly. It will be appreciated, of course, that what actually can occur is that, rather than getting −8.4V due to the m=7 switched capacitors, the switches used to switch the switched capacitors will not be well controlled, and the converter circuit will not operate as expected. To avoid such extreme positive and negative voltages, the coupling of switched capacitors is configured during phase I and phase II so as to avoid capacitor voltage combinations that can adversely influence operation of the switches used to switch the switched capacitors.

A switched capacitor order is defined for each different gain. Recall that the number of switch capacitors in the n set determines the gain. Switched capacitor order shall be explained relative to switch capacitor positions in the series connection during phase I. In the table of FIG. 6, the switched capacitor coupled closest to the positive battery terminal is labeled "15". The switched capacitor coupled closest to the ground terminal is labeled "0". The other nine switch capacitors are labeled in numerical order of their positions relative to the switch capacitor in position (15) connected to the battery terminal voltage and the switch capacitor in position (0) coupled to ground.

More specifically, different gains correspond to different n sets of switched capacitors and to different m sets of switched capacitors. As explained above, in accordance with some embodiments, each switched capacitor has a prescribed series connection position during phase I. The series positions for switched capacitors may be determined not only so as to avoid voltage levels that may cause switches to not operate correctly, but also so as to minimize chip area occupied and power consumed by switch circuitry and switch control circuitry, for example. The switched capacitor "order" for a given gain represents the series connection positions of the n set switched capacitors and of the m set capacitors for that given gain. As shown in the table of FIG. 6, switched capacitor order corresponds to a gain value a minimum voltage value and to a gain value maximum voltage value for the given selected value of n.

In the table of FIG. 6, a "1" in a row location in a column symbolizes that the switch capacitor having the series connection order during the charge phase (phase I) indicated at the top of the column is selected as a member of the n set. A "0" symbolizes that the switch capacitor having the series connection order during the charge phase (phase I) indicated at the top of the column is selected as a member of the m set. For example, referring the top row of the table in FIG. 6, assuming that the selected gain=0.313, switch capacitors having series connection order positions, (15), (13), (9), (6), (2) and (0), are members of the n set, and switch capacitors having series connection order positions, (14), (12), (11), (10), (8), (7), (5), (4), (3) and (1), are members of the n set. Thus, it can be seen that for gain=3.13, n=6 and m=10. Therefore, it will be understood that switched capacitor "order" for a gain represents the number of switched capacitors in the n set and the number of switched capacitors in the m set and their series connection positions during phase I.

For the gain=0.313 example, the minimum switched capacitor voltage for gain=0.313 is −0.22V, and the maximum switch capacitor voltage is 4.32V. The switch capacitor having the highest voltage (i.e. 4.32 V) is switch capacitor in position (5). For the operation of the switches that control the switch capacitors, the most convenient is to have switch capacitor in position (15) to hold the maximum voltage. However, as explained below, the implementation allows other switch capacitors to have a higher voltage than switch capacitor in position (15) as long as the difference is less than 300 mV.

The switched capacitor orders were arrived at through empirical testing. For example, for n=6 it was found that there are 8009 different ways of sorting the series connection of the switch capacitors during phase I. Each sorting produces a different value of maximum and minimum voltages. Positioning the switched capacitor having the maximum voltage on top of the series connection of all switched capacitors is a priori, the most convenient in order to avoid over voltages. Also, avoiding connecting too many m capacitors consecutively in a row, without interleaving an n capacitor, is desirable in order to limit the minimum voltage in the network.

Although there are several viable sort order configurations, not all have the same impact upon power consumption. Moreover, sorting the switch capacitors in a way that minimizes the control logic is important to limiting power consumption and chip area. During the empirical testing, computer program logic configured a computer to compare possible switch capacitor sort order configurations for each gain setting and to select those that minimize control logic by using as much as possible each switched capacitor in a consistent way across gain settings. For example, if a switch capacitor is used within the n set for a gain setting and then within the m set for the next gain setting, this implies switches for both n set and m set configurations should be provided for this switch capacitor. However, if a switch capacitor is always used within the n set, then m set switches not required for that capacitor, thus saving power. Moreover, during the empirical testing, ±300 mV of excess voltage was allowed when running switched capacitor order. A voltage of −300 mV was designated as the most negative voltage permitted, and +300 mV was designated as the maximum difference between the capacitor with the highest voltage and the top-most switch capacitor in the series connection.

It will be appreciated that in accordance with some embodiments, each different gain corresponds to a different "charge configuration" of individual capacitors and corresponds to a different "discharge configuration" of individual capacitors. Referring again to FIG. 6, the series connection order associated gain 0.313 constitutes a charge configuration for that gain. Thus, in accordance with some embodiments, the charge configuration corresponding to a gain 0.313 includes the switch capacitors having series connection order positions, (15), (13), (9), (6), (2) and (0), being members of the n set, and switch capacitors having series connection order positions, (14), (12), (11), (10), (8), (7), (5), (4), (3) being members of the n set. Conversely, different gain also corresponds to a different discharge configuration of individual capacitors. Still referring to FIG. 6, the combination of the number of capacitors in the n set and the number of capacitors in the m set associated with gain 0.313 constitutes a discharge configuration for that gain. It will be appreciated that in the example embodiment, there are eleven gains, and therefore, there are eleven different charge configurations and eleven different discharge configurations.

Example of Normal Operating Range

Figure 7:
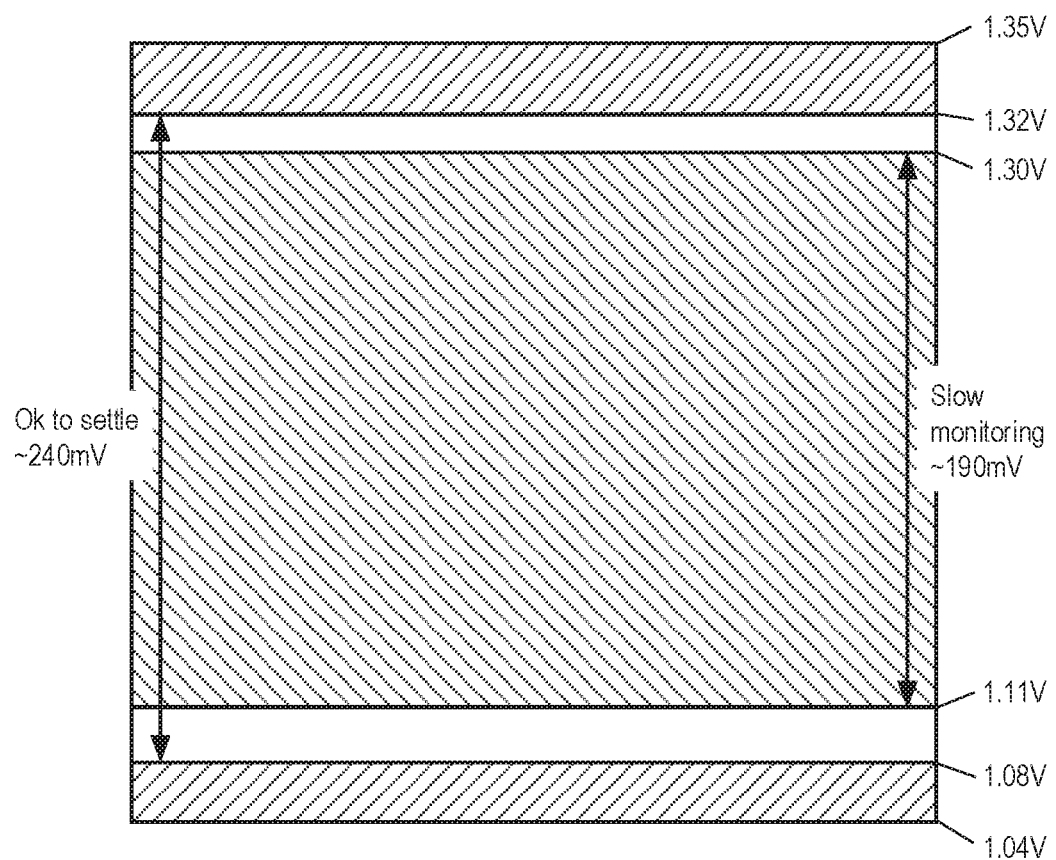
FIG. 7 is an illustrative drawing showing normal operating range for a converter in accordance with some embodiments.

FIG. 7 is an illustrative drawing showing normal operating range for a converter in accordance with some embodiments. The prescribed normal operating region for $V_{out}$ of the example implementation is approximately from a lower voltage $V_1$=1.080V to an upper voltage $V_2$=1.320V, which represents an output voltage range of approximately 240 mV. In accordance with the example implementation, detecting $V_1$ within the normal range but less than or equal to 1.11V or detecting $V_2$ within the normal range but greater than or equal to 1.30V triggers a transition to a higher $V_{out}$ sampling frequency. In accordance with the example implementation, detecting a $V_1$ less than 1.04V and detecting $V_2$ greater than 1.36V triggers a search for a new gain.

Overview of Switch Capacitor Control

Figure 8:
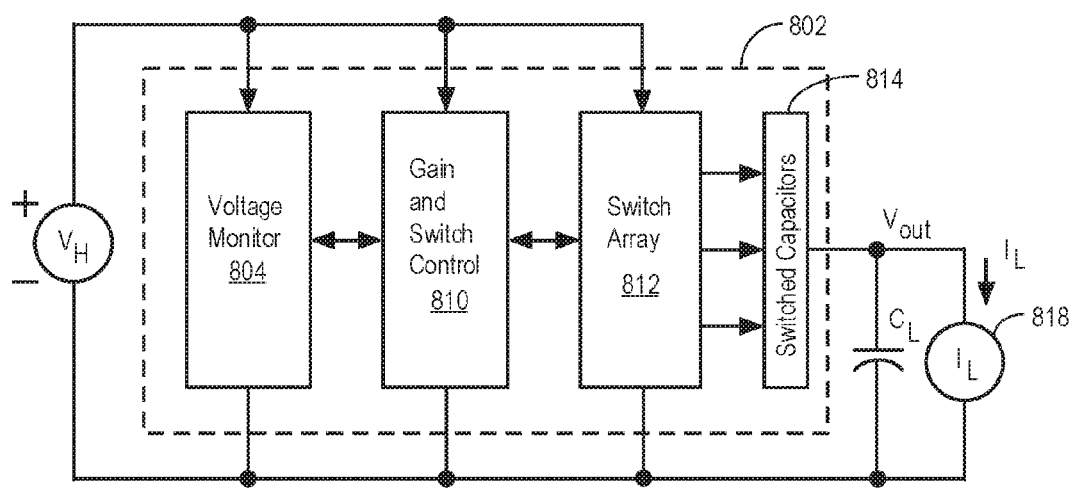
FIG. 8 is an illustrative block diagram showing additional details of control blocks of DC-DC switched capacitor voltage converter in accordance with some embodiments.

FIG. 8 is an illustrative block diagram showing additional details of control blocks of DC-DC switched capacitor voltage converter 802 in accordance with some embodiments. The converter 802 includes a voltage monitoring circuitry block 804 and a gain and switch control logic circuitry block 810, a switch array circuitry block 812 and switched capacitors $C_1$ to $C_{m+n}$ 814. A battery 816 is coupled to provide a battery voltage $V_H$ level, which acts as Vin, to each of the circuitry blocks 804, 810 and 812. An output terminal coupled to the switch array is coupled to provide $V_{out}$, which acts as an input voltage to the Load circuit 818, which is coupled in parallel with a reservoir capacitor $C_L$. The Load 818 draws current $I_L$.

The voltage monitoring circuitry block 804 monitors $V_{out}$ to monitors and identifies the $V_{out}$ voltage level and reports the identified voltage level to the gain and switch control 810, which determines whether $V_{out}$ is within a prescribed voltage range. In response to a determination that the $V_{out}$ is not within the prescribed voltage range, the gain and switch control 810 selects an alternate gain that results in $V_{out}$ settling within the prescribed voltage range. More particularly, in accordance with some embodiments, in response to a determination that the $V_{out}$ is not within the prescribed voltage range, the gain and switch control 810 selects a sequence of alternate gains, monitor $V_{out}$ resulting from each successive selection, and selects a gain that results in $V_{out}$ settling within the prescribed voltage range.

Voltage Monitoring and Gain Control

Figure 9A:
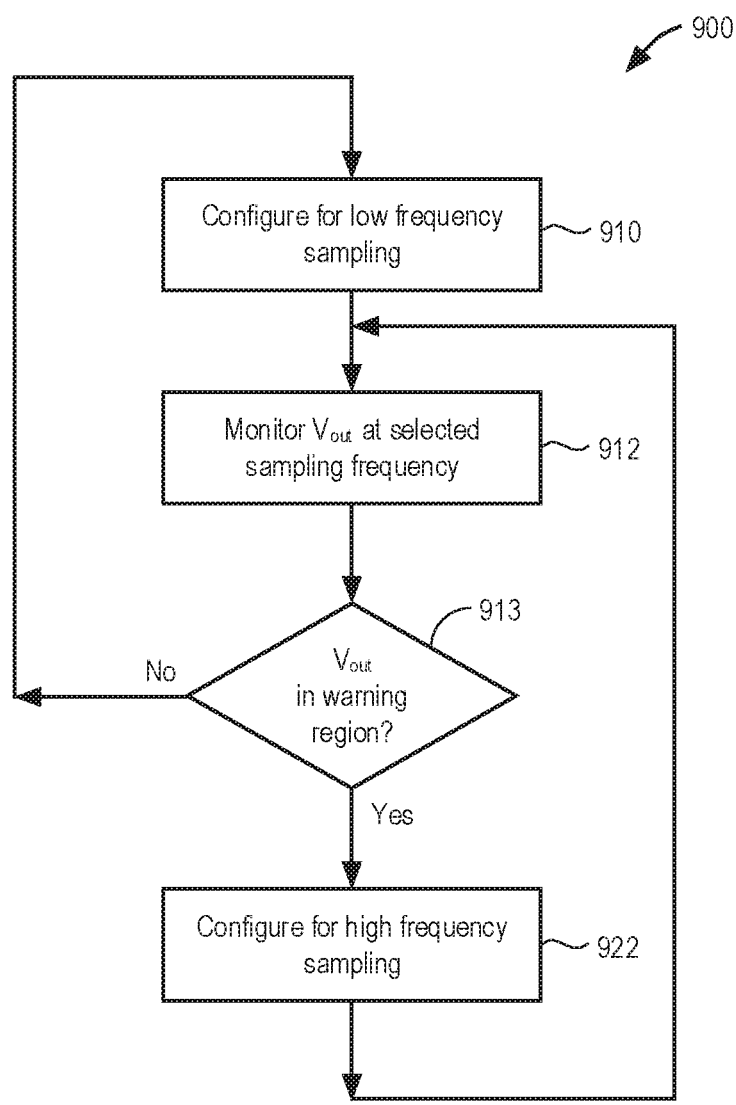
FIGS. 9A-9C are illustrative flow diagrams representing a processes to monitor and adjust output voltage sampling frequency (FIG. 9A) to monitor and adjust output voltage to keep it within a prescribed voltage range (FIG. 9B) and to search for a suitable gain to bring the output voltage back into the range (FIG. 9C) in accordance with some embodiments.
Figure 9B:
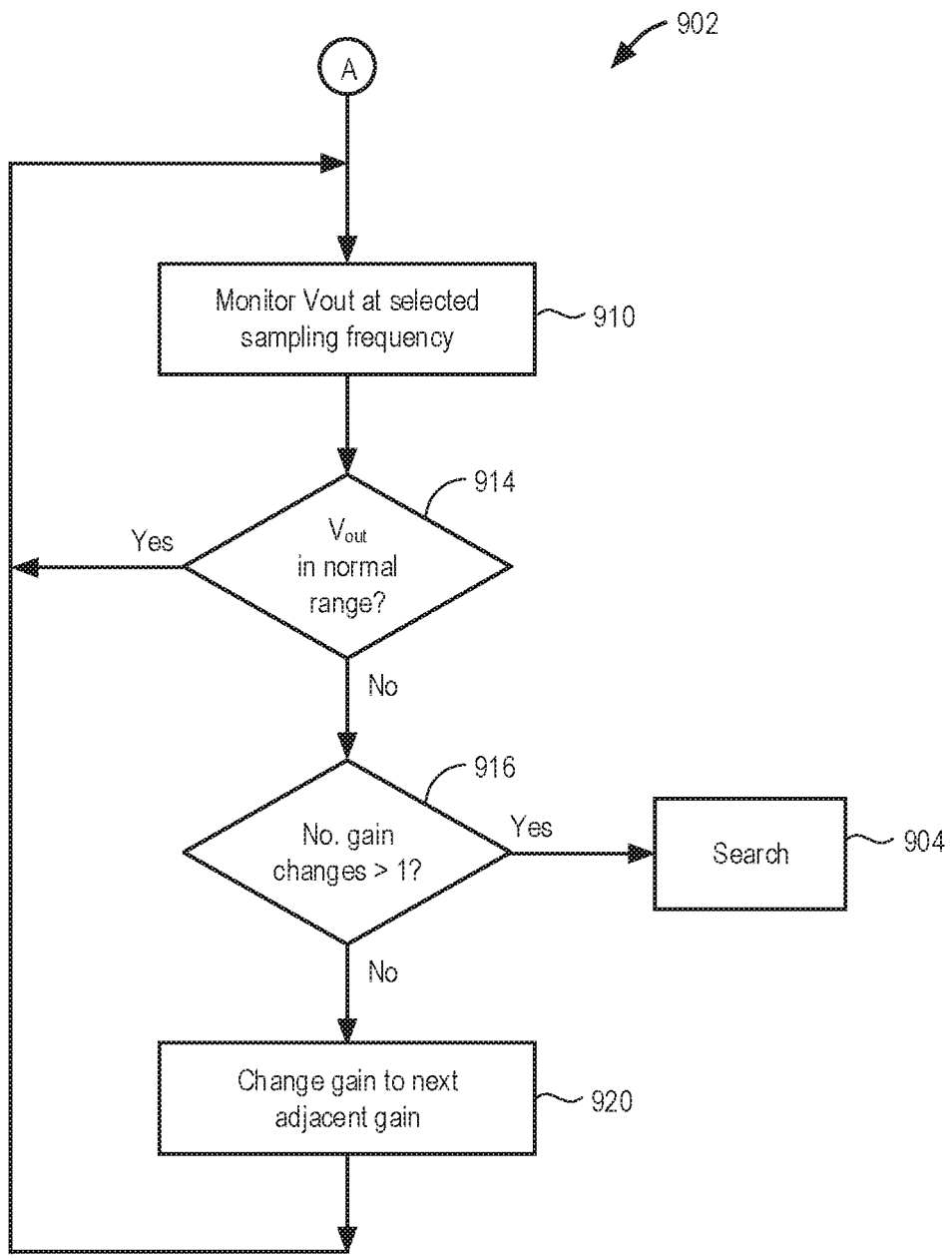
Figure 9C:
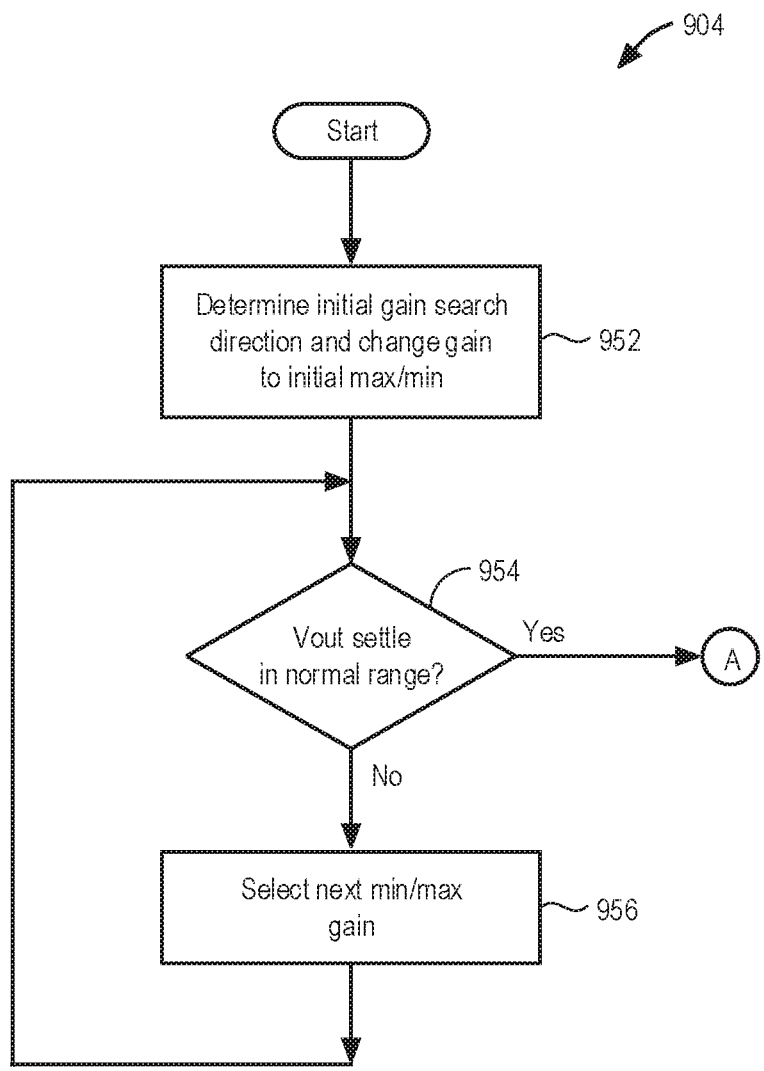

FIGS. 9A-9C are illustrative flow diagrams representing a processes, 900, 902, 904 to monitor and adjust output voltage sampling frequency (FIG. 9A) to monitor and adjust output voltage to keep it within a prescribed voltage range (FIG. 9B) and to search for a suitable gain to bring the output voltage back into the range (FIG. 9C) in accordance with some embodiments.

As explained above, different gains correspond to different switch capacitor configurations, which correspond to different numbers of switch capacitors in the n set and in the m set. In accordance with some embodiments, the converter 802 does not continuously regulate output voltage $V_{out}$. Rather, in response to a determination that $V_{out}$ is detected to be outside of a prescribed normal operating range, a gain search process is triggered to determine a gain that brings $V_{out}$ back within the prescribed range. This process maintains $V_{out}$ within the prescribed range as long as the battery voltage and load current change relatively slowly. In general, operating conditions involve battery voltage and load current typically changing only gradually. In general, a battery typically takes hours, even days to discharge down to a non-operative level. Similarly, a load current typically changes primarily with temperature, which ordinarily is relatively stable.

Referring to FIG. 9A, module 910 configures monitoring circuitry 804 to sample $V_{out}$ at a lower first sampling rate. In the example implementation, the lower first sampling rate is in the range 8-16 kHz. Module 912 configures the monitoring circuitry 804 to sample the output voltage $V_{out}$ at its presently configured sampling rate. Decision module 913 configures the monitoring circuitry 804 to determine whether $V_{out}$ has reached either a lower warning region threshold or an upper warning region threshold. In the example implementation, the lower warning region threshold is $V_1$=1.11V, and the upper warning region threshold is $V_2$=1.30V. Thus, the lower warning region extends between $V_1$=1.11V and V1=1.08V, and the upper warning region extends between V2=1.30V and V2=1.32V. In response to a determination that $V_{out}$ is within either the upper or lower warning region, module 922 configures monitoring circuitry 804 to sample $V_{out}$ at a higher second sampling rate. Control next flows back to module 912 and sampling proceeds at the higher sampling rate. In response to a determination by decision module 913 that $V_{out}$ is not within either the upper or lower warning region, control flows back to module 910 and sampling proceeds at the lower sampling rate sampling rate.

The upper and lower warning thresholds regions are selected to be close enough to the upper and lower voltage limits of the normal range that detection of a $V_{out}$ level within either of these warning regions indicates an increased likelihood that the output voltage soon will drift outside the normal range. The upper and lower warning thresholds are selected to be far enough from the upper and lower voltage limits that there will be sufficient time to detect the $V_{out}$ level drifting outside the normal range before it drifts too far out and to change the gain to bring $V_{out}$ back into the normal range. It will be appreciated that using a lower sampling frequency when the output voltage is well within the normal range conserves power. Moreover, using the higher sampling frequency when the output voltage is near the limits of the normal range, helps to more quickly detect when $V_{out}$ goes out of the normal range so that gain correction can be made more quickly.

Referring to FIG. 9B, module 910 configures monitoring circuitry 804 to proceed with sampling $V_{out}$ at the presently configured sampling rate. Decision module 914 configures the gain and switch control block 810 to determine whether $V_{out}$ is within the prescribed normal operating range. In response to a determination that $V_{out}$ is within the normal range, control flows back to module 910 and sampling proceeds at the presently configured sampling rate. As explained above with reference to FIG. 9A, the sampling rate may vary depending upon whether $V_{out}$ is within the upper or lower warning region. In response to a determination by decision module 914 that $V_{out}$ is outside the normal operating range, control flows to decision module 916, which determines whether a prescribed number changes in gain have been made to correct for a $V_{out}$ that continues to be outside the normal range. In accordance with some embodiments, the prescribed number of gain changes is one. In response to a determination that at least the prescribed number changes in gain have been made for a $V_{out}$ that continues to be outside the normal range, the search process 904 explained with reference to FIG. 9C is triggered. On the other hand, in response to a determination by decision module 916 that the prescribed number of gain changes has not been made, module 920 configures the gain control block to change gain to a next adjacent gain to attempt to move $V_{out}$ to within the normal range. More specifically, in response to a detected $V_{out}$ below the normal output voltage range, the gain and switch control 810 changes gain to a next higher gain so as to attempt to increase $V_{out}$. Conversely, in response to a detected $V_{out}$ above the normal output voltage range, the gain and switch control 810 changes gain to a next lower gain so as to attempt to decrease $V_{out}$. Control then flows to the monitoring block 804 to continue sampling at the presently selected sampling rate.

Thus, the gain adjustment process 902 of FIG. 9B proceeds incrementally unless $V_{out}$ surpasses an upper or lower threshold limit or unless the output voltage continues to be outside the normal range after a prescribed number of gain changes are made in an attempt to bring it back within the normal range. The gain search process 904 of FIG. 9C is triggered in response to detection of an output voltage outside the threshold limits or failure of a prescribed number of gain changes to bring the output voltage into the normal range.

Referring to FIG. 9C, module 952 configures the gain and switch control 810 to determine an initial gain search direction and to select an initial gain. More specifically, in response to detection by the monitoring block 804 of a $V_{out}$ below the lower threshold limit, the gain and switch control 1 810 changes the gain to the maximum higher gain. The maximum higher gain is 0.938, which corresponds to n=16, in the example implementation. Conversely, in response to detection by the monitoring block 804 of a $V_{out}$ above the upper threshold limit, the gain and switch control 810 changes the gain to the minimum lower gain. The minimum lower gain is 0.313, which corresponds to n=6, in the example implementation.

Decision module 954 configures the gain and switch control 810 to determine whether $V_{out}$ has settled within the normal range in response to the gain change. In response to a determination that $V_{out}$ has returned to the normal range, control flows back to the process 902 of FIG. 9B. In response to a determination by decision module 954 that $V_{out}$ has not yet returned to the normal range, module 956 selects a next minimum or maximum gain, as the case may be, in the direction opposite the previously selected gain. In other words, if the presently selected gain is closer to the minimum gain, then the next maximum gain that has not yet been tried is selected. On the other hand, if the presently selected gain is closer to the maximum gain, then the next minimum gain that has not yet been tried is selected. Control next flows again to decision module 954 and the process repeats until $V_{out}$ returns to the normal range. Thus, the search process involves a search for gains that commences with gains at the outer limits, i.e. the highest and lowest gains, and that converges upon a gain that brings $V_{out}$ back into the normal range.

Example Gain Search

Figure 10:
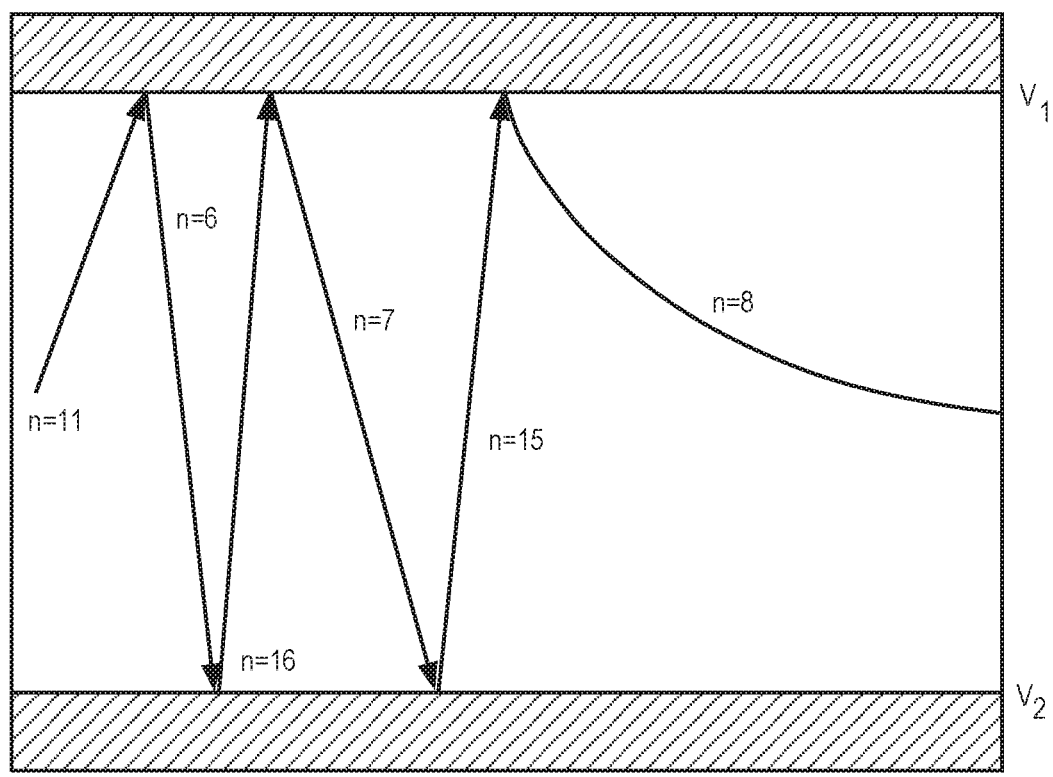
FIG. 10 is an illustrative drawing representing an example of the search process of FIG. 9C in accordance with the some embodiments.

FIG. 10 is an illustrative drawing representing an example of the search process of FIG. 9C in accordance with the some embodiments. The example search process applies to the example implementation described above with reference to FIGS. 4-6. The search process involves repeatedly changing the gain so as to drive $V_{out}$ to the opposite extreme of the normal voltage range each time the $V_{out}$ hits an upper or lower bound of the normal voltage range, until a gain is identified that results in $V_{out}$ settling within the normal range. The gains used to drive $V_{out}$ to the normal voltage range extremes are reduced in each iteration so that after a few iterations all gains values have been tried.

Assume, for example that at the outset of the search process 904, gain is 0.625, which corresponds to n=11 and that $V_{out}$ is above the upper limit of the normal range, 1.32V. Decision module 952 determines that the initial gain search direction is to be in the direction of the lower limit of the normal voltage range and selects the minimum gain, which corresponds to n=6. As shown in the example in FIG. 10, a gain corresponding to n=6 results in $V_{out}$<1.08V. Decision module 954 determines that $V_{out}$ has not settled into the normal output voltage range. Module 956 selects a next maximum gain (since in the prior iteration a minimum gain was selected), which corresponds to n=16. As shown in the example in FIG. 10, a gain corresponding to n=16 results in $V_{out}$>1.32V. Decision module 954 again determines that $V_{out}$ has not settled into the normal output voltage range. Module 956 selects a next minimum gain (since in the prior iteration a maximum gain was selected), which corresponds to n=7. As shown in the example in FIG. 10, a gain corresponding to n=7 results in $V_{out}$<1.08V. Decision module 954 again determines that $V_{out}$ has not settled into the normal output voltage range. Module 956 selects a next maximum gain (since in the prior iteration a minimum gain was selected), which corresponds to n=15. Decision module 954 again determines that $V_{out}$ has not settled into the normal output voltage range. Module 956 selects a next minimum gain (since in the prior iteration a maximum gain was selected), which corresponds to n=8. This time, decision module 954 determines that $V_{out}$ has settled into the normal output voltage range. The search process of FIG. 9C, ends and the monitoring and gain adjustment process 902 of FIG. 9B resumes.

Switch Control

Figure 11:
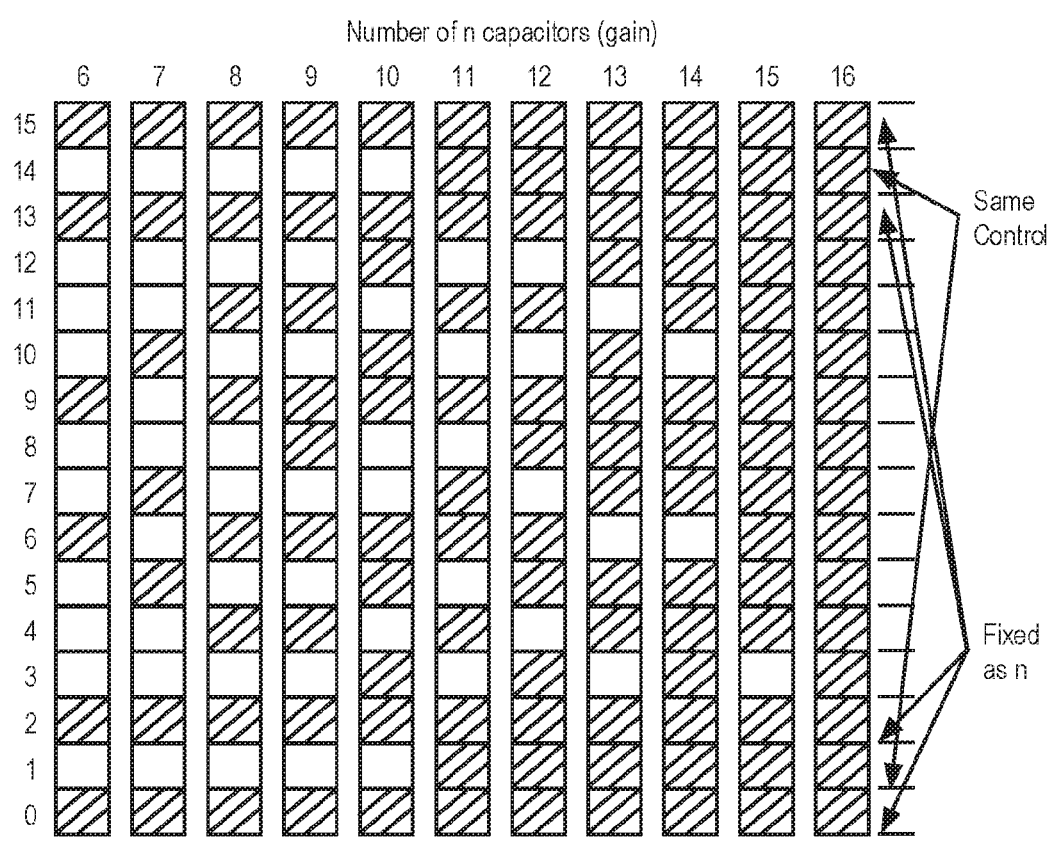
FIG. 11 is an illustrative drawing showing relationships between different gains and different n sets and corresponding m sets, which provide a framework for control of switches in accordance with some embodiments.

FIG. 11 is an illustrative drawing showing relationships between different gains and different n sets and corresponding m sets, which provide a framework for control of switches in accordance with some embodiments. It will be appreciated that the relationships shown in FIG. 11 use the example switched capacitor order of FIG. 6. Also, it will be recalled that gain increases with an increase in proportion to the number of switched capacitors in the n set.

In FIG. 11, the light shaded squares indicate n set membership, and the dark shaded squares represent m set membership. Each horizontal row in FIG. 11 represents role of a given switched capacitor for different gain settings. For example the row labeled "15" shows the role switched capacitor in position (15), the top-most series connection position during each of multiple different gain settings. More particularly, in the example implementation, the top-most switched capacitor (15) is always an n set member. However, for example, switched transistor in position (10) in FIG. 11, which is in the sixth series connection position from the top, is an n set member for gains 0.375, 0.563, 0.750, 0.875, 0.938 and is an m set member for gains 0.313, 0.438, 0.500, 0.625, 0.688, and 0.813.

In FIG. 11, the heading of each column indicates the number of switched capacitors in the n set for a corresponding row of FIG. 6. For example, the left most column of FIG. 11 corresponds to the top row of FIG. 6 and so on. Thus, for example in the column corresponding to n=9, switch capacitors in the (12), (10), (7), (5), (3), and (1) positions are members of the n set and switch capacitors in the (15), (13), (11), (9), (8), (6), (4), (2), and (0) positions are members of the m set.

It will be appreciated that control logic can be minimized by implementing the capacitor order so that certain switch capacitors have fixed membership in the n set and so that some capacitors can share control logic. Referring to the table of FIG. 11, for example, it can be seen that four switch capacitors having order (15), (13), (2) and (0) have fixed membership in the n set. It also can be seen that switch capacitors having order (14) and (1) can share the same switch control logic since they have identical n set and m set memberships across all gains.

Switch Circuitry

Figure 12:
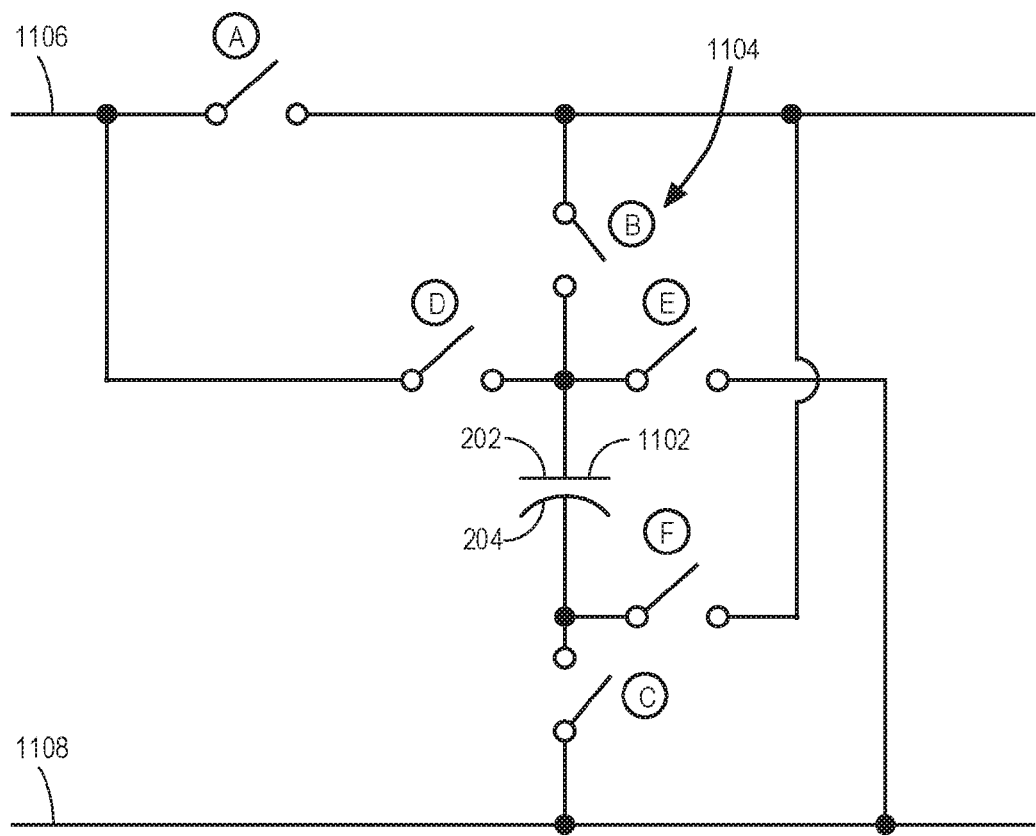
FIG. 12 is an illustrative switched capacitor and an associated switch matrix in accordance with some embodiments.

FIG. 12 is an illustrative switched capacitor 1102 and an associated switch matrix 1104 in accordance with some embodiments. The switch matrix portion 1104 includes switches A-G as shown. It will be appreciated that the switch matrix portion 1104 is a part of a larger overall switch matrix (not shown). The switches are controlled so as to couple the switch capacitor 1102 between nodes 1106 and 1108 that are internal to the overall switch matrix. The switch matrix portion 1104 is used to switch the switched capacitor 1102 between a phase I configuration represented by illustrative FIG. 13A, an n set member phase II configuration represented by illustrative FIG. 13B and an m set member phase II configuration represented by illustrative FIG. 13C. In order to simplify the explanation, only the switches that are closed are shown in each of FIGS. 13A-13C.

Figure 13A:
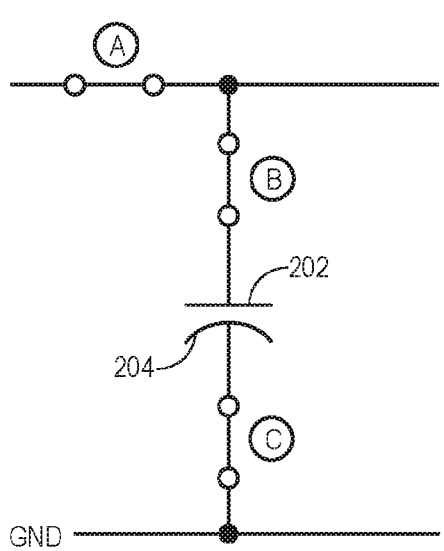
FIGS. 13A-13C are illustrative drawings showing the capacitors and switches in FIG. 12 configured in a Phase I configuration (FIG. 13A), for n set configuration in phase II (FIG. 13B) and for m set configuration in phase II (FIG. 13C).

In the phase I configuration shown FIG. 13A, the switched capacitor 1102 is coupled in series in its designated order/position with other switched capacitors (not shown). Table 1 explains the phase I switch configurations for the example switched capacitor 1102.

TABLE 1

| Switch | Configuration (opened/closed) |
|--------|-------------------------------|
| A | Closed |
| B | Closed |
| C | Closed |
| D | Opened |
| E | Opened |
| F | Opened |

Figure 13B:
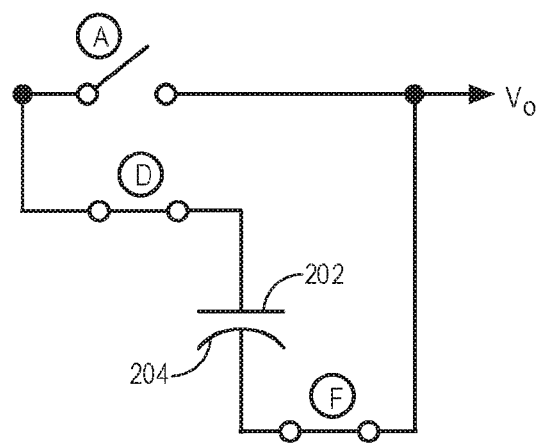

In the n set member phase II configuration shown FIG. 13B, the switched capacitor 1102 is coupled in series with CL and the load (not shown) and in parallel with other n set member switched capacitors (not shown). Table 2 explains the n set phase II switch configurations for the example switched capacitor 1102.

TABLE 2

| Switch | Configuration (opened/closed) |
|--------|-------------------------------|
| A | Opened |
| B | Opened |
| C | Opened |
| D | Closed |
| E | Opened |
| F | Closed |

Figure 13C:
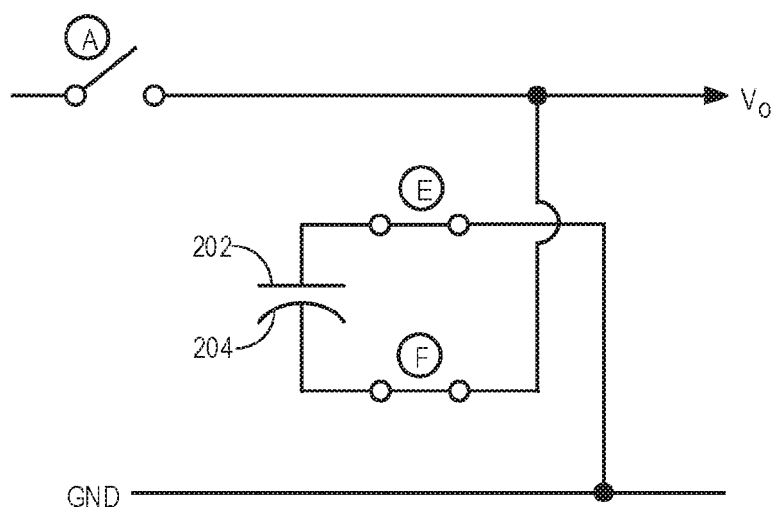

In the m set member, phase II configuration shown FIG. 13C, the switched capacitor 1102 is coupled in parallel with CL and the load (not shown) and in parallel with other m set member switched capacitors (not shown) and with its polarity reversed. Table 3 explains the m set phase II switch configurations for the example switched capacitor 1102.

TABLE 3

| Switch | Configuration (opened/closed) |
|--------|-------------------------------|
| A | Closed |
| B | Opened |
| C | Opened |
| D | Opened |

TABLE 3-continued

| Switch | Configuration (opened/closed) |
|--------|-------------------------------|
| E | Closed |
| F | Closed |

The foregoing description and drawings of embodiments are merely illustrative of the principles of the invention. Various modifications can be made to the embodiments by those skilled in the art without departing from the spirit and scope of the invention, which is defined in the appended claims.

The invention claimed is:

1. A switched capacitor voltage converter to convert a DC voltage source level to a DC load voltage level, comprising:
    a plurality of capacitors that includes m+n capacitors, wherein m and n are integers and m+n is greater than eight;
    an array of switches configured to alternately switch the m+n capacitors between a first phase configuration and a second phase configuration selectable from among multiple second phase configurations;
    wherein in the first phase configuration, the plurality of capacitors are coupled in series with each other and in parallel with the DC voltage source voltage, each capacitor having a first plate and a second plate, a capacitor coupled at a first end of the series having its first plate coupled to the source voltage, a capacitor coupled at a second end of the series having its second plate coupled to ground, each capacitor in between the capacitors at the first and second ends of the series having its first plate coupled to a second plate of a capacitor adjacent to it in the series; and
    wherein in the second phase configuration, the plurality of capacitors have their second plates coupled to a load, a first set of capacitors having n capacitors from the plurality of capacitors coupled in parallel with each other and in series with the load and having their first plates coupled to the source voltage, and a second set of capacitors having m capacitors from the plurality of capacitors coupled in parallel with the load and having their first plates coupled to ground.

2. The converter of claim 1,
    wherein in the second phase configuration, the second set of capacitors are coupled in parallel with a reservoir capacitor.

3. A switched capacitor voltage converter to convert a DC voltage source level to a DC load voltage level, comprising:
    a plurality of capacitors that includes m+n capacitors, wherein m and n are integers and m+n is greater than eight;
    a load voltage monitor circuit configured to identify the DC load voltage level;
    a switch controller responsive to the identified DC load voltage level; and
    an array of switches responsive to the switch controller, configured to alternately switch the plurality of capacitors between at least one first phase configuration and a second phase configuration that is selectable from among multiple second phase configurations;
    wherein in the at least one first phase configuration, the plurality of capacitors are coupled in series with each other and in parallel with a source voltage, each capacitor having a first plate and a second plate, a capacitor coupled at a first end of the series having its first plate coupled to the source voltage, a capacitor at a second end of the series having its second plate coupled to ground, each capacitor in between the capacitors at the first and second ends of the series having its first plate coupled to a second plate of a capacitor adjacent to it in the series;

wherein in the selectable second phase configuration, the plurality of capacitors have their second plates coupled to a load, a first set of capacitors having n capacitors from the plurality of capacitors are coupled in parallel with each other and in series with the load, and a second set of capacitors from the plurality of capacitors having m capacitors coupled in parallel with the load and having their first plates coupled to ground;

wherein the switch controller is configured to select the selectable second phase configuration based at least in part upon the identified DC load voltage level; and wherein the switch controller is configured to cause the array of switches to alternately couple the plurality of capacitors in the at least one first phase configuration and the selected second phase configuration.

4. The converter of claim 3,
wherein n is different for each of the multiple second phase configurations; wherein m is different for each of the multiple second phase configurations; and wherein a sum m+n is constant for each of the multiple second phase configurations.

5. The converter of claim 3, wherein in each of the multiple second phase configurations, the second set of capacitors is coupled in parallel with a reservoir capacitor.

6. The converter of claim 3,
wherein the at least one first phase configuration is selectable from among multiple first phase configurations;
wherein each respective first phase configuration has a different series coupling order of the second set member capacitors and the first set member capacitors.

7. The converter of claim 3, wherein the switch controller is configured to select a new gain that is greater than a currently selected gain in response to an identified DC load voltage level outside a normal operating voltage region and below a lower voltage level of the normal operating voltage region of the identified DC load voltage level;
wherein the switch controller is configured to select a new gain that is less than a currently selected gain in response to an identified DC load voltage level outside the normal operating voltage region and above an upper voltage level of the normal operating region of the DC load voltage level; and
wherein the switch controller is configured to cause switches of the array to alternately couple the plurality of capacitors in the at least one first phase configuration and a second phase configuration selected from among of multiple second phase configurations that corresponds to the selected new gain.

8. A switched capacitor voltage converter to convert a DC voltage source level to a DC load voltage level, comprising:
multiple capacitors;
a load voltage monitor circuit configured to identify the DC load voltage level;
a switch controller responsive to the identified DC load voltage level; and
an array of switches responsive to the switch controller, configured to alternately switch the multiple capacitors between at least one first phase configuration and a second phase configuration that is selectable from among multiple second phase configurations, each corresponding to a different gain;

wherein in the at least one first phase configuration, the multiple capacitors are coupled in series with each other and in parallel with a source voltage, each capacitor having a first plate and a second plate, a capacitor coupled at a first end of the series having its first plate coupled to the source voltage, a capacitor coupled at a second end of the series having its second plate coupled to ground, each capacitor in between the capacitors at the first and second ends of the series having its first plate coupled to a second plate of a capacitor adjacent to it in the series; and wherein in the selectable second phase configuration, the multiple capacitors have their second plates coupled to a load, a first set of capacitors having a first number of the multiple capacitors coupled in parallel with each other and in series with the load, and a second set of capacitors from the multiple capacitors having a second number of the multiple capacitors coupled in parallel with the load and having their first plates coupled to ground;

wherein the switch controller is configured to select a gain based at least in part upon the identified DC load voltage level; and wherein the switch controller is configured to cause the array of switches to alternately couple the multiple capacitors in the at least one first phase configuration and a second phase configuration that corresponds to the selected gain.

9. The converter of claim 8,
wherein in the second phase configuration, the second set of capacitors having the second number of the multiple capacitors are coupled in parallel with a reservoir capacitor.

10. The converter of claim 8,
wherein the load voltage monitor circuit is configured to sample load voltage at a lower frequency while the load voltage is within a safe voltage range and to sample the load voltage at a higher frequency while the load voltage is within a warning voltage range.

11. The converter of claim 8,
wherein the switch controller is configured to conduct a gain search in response to an identified DC load voltage level outside a normal operating voltage range;
wherein the gain search includes selecting a sequence of new gains from among a plurality of gains that are alternately a greatest gain from among the plurality larger than a currently selected gain, that has not been selected previously in the gain search, and a least gain from among the plurality of gains less than a currently selected gain from among the plurality of gains, that has not been selected previously in the gain search;
wherein the switch controller is configured to halt the gain search in response to the identified DC load voltage level within the normal operating voltage range; and
wherein the switch controller is configured to successively cause the array of switches to alternately couple the multiple capacitors in the at least one first phase configuration and a sequence of second phase configurations each corresponding to a selected new gain.

12. A method to configure switched multiple capacitors to convert a DC voltage source level to a DC load voltage level, comprising:
alternately switching a plurality of capacitors that includes m+n capacitors, wherein m and n are integers and m+n is greater than eight, between a first phase configuration and a second phase configuration;

wherein in the first phase configuration, the plurality of capacitors are coupled in series with each other and in parallel with a source voltage, each capacitor having a first plate and a second plate, a capacitor coupled at a first end of the series having its first plate coupled to the source voltage, a capacitor coupled at a second end of the series having its second plate coupled to ground, each capacitor in between the capacitors at the first and second ends of the series having its first plate coupled to a second plate of a capacitor adjacent to it in the series; and wherein in the second phase configuration, the plurality of capacitors have their second plates coupled to a load, a first set of capacitors having n capacitors from the plurality of capacitors are coupled in parallel with each other and in series with the load and have their first plates coupled to the source voltage, and a second set of capacitors having m capacitors coupled in parallel with the load and having their first plates coupled to ground.

13. A method to configure switched multiple capacitors to convert a DC voltage source level to a DC load voltage level, comprising:

monitoring the DC load voltage level to identify a current DC voltage load level;

selecting a gain in response to the identified current DC voltage level; and alternately switching the multiple capacitors between at least one first phase configuration and a second phase configuration that corresponds to the selected gain selected from among multiple second phase configurations, each corresponding to a different gain;

wherein in the at least one first phase configuration, the multiple capacitors are coupled in series with each other and in parallel with a source voltage, each capacitor having a first plate and a second plate, a capacitor coupled at a second end of the series having its first plate coupled to the source voltage, a capacitor coupled at a second end of the series having its second plate coupled to ground, each capacitor in between the capacitors at the first and second ends of the series having its first plate coupled to a second plate of a capacitor adjacent to it in the series; and wherein in the selectable second phase configuration, the multiple capacitors have their second plates coupled to a load, a first set of capacitors having a first number of the multiple capacitors coupled in parallel with each other and in series with the load, and a second number of capacitors having a second number of the multiple capacitors coupled in parallel with the load and having their first plates coupled to ground.

14. The method of claim 13,
wherein monitoring the DC load voltage level to identify a current DC voltage load level includes sampling the DC load voltage level at a lower frequency while the DC load voltage level is within a safe voltage range and sampling the DC load voltage level at a higher frequency while the DC load voltage level is within a warning voltage range.

15. The method of claim 13,
wherein selecting the gain in response to the identified current DC voltage level includes selecting a new gain in response to the identified DC load voltage level within a warning voltage range.

16. The method of claim 13,
wherein selecting the gain in response to the identified current DC voltage level includes selecting a new gain that is greater than a currently selected gain in response to an identified DC load voltage level outside a normal operating voltage range and below a lower voltage level of the normal operating voltage range of the DC load voltage level;

wherein selecting the gain in response to the identified current DC voltage level includes selecting a new gain that is less than a currently selected gain in response to the identified DC load voltage level outside a normal operating voltage range and above an upper voltage level of the normal operating region of the DC load voltage level.

17. The method of claim 13,
wherein selecting the gain in response to the identified current DC voltage level includes conducting a gain search in response to the identified current DC load voltage level outside a normal operating voltage range;

wherein the gain search includes selecting a sequence of new gains from among a plurality of gains that are alternately a greatest gain from among the plurality larger than a currently selected gain, that has not been selected previously in the gain search, and a least gain from among the plurality of gains less than a currently selected gain from among the plurality of gains, that has not been selected previously in the gain search;

wherein conducting the gain search includes halting the gain search in response to the identified DC load voltage level within the normal operating voltage range.

* * * * *

UNITED STATES PATENT AND TRADEMARK OFFICE
CERTIFICATE OF CORRECTION

PATENT NO. : 9,866,110 B2
APPLICATION NO. : 14/469975
DATED : January 9, 2018
INVENTOR(S) : Ruiz et al.

Page 1 of 2

It is certified that error appears in the above-identified patent and that said Letters Patent is hereby corrected as shown below:

On the Title Page

On page 2, in Column 2, item (56) under "Other Publications", Line 10, after "Resistances", insert --of--

On page 2, in Column 2, item (56) under "Other Publications", Line 10, delete "Po wer" and insert --Power-- therefor In the Claims In Column 14, Line 18, in Claim 1, after "are", insert --each--

In Column 14, Line 18, in Claim 1, before "greater", delete "and m+n is"

In Column 14, Line 19, in Claim 1, delete "eight;" and insert --one;-- therefor

In Column 14, Line 51, in Claim 3, after "are", insert --each--

In Column 14, Line 51, in Claim 3, before "greater", delete "and m+n is"

In Column 14, Line 52, in Claim 3, delete "eight;" and insert --one;-- therefor

In Column 15, Line 23, in Claim 4, after "configurations;", insert --¶--

In Column 15, Line 24, in Claim 4, after "and", insert --¶--

In Column 16, Line 65, in Claim 12, after "are", insert --each--

Signed and Sealed this
Fourth Day of June, 2019

Andrei Iancu
*Director of the United States Patent and Trademark Office*

In Column 16, Line 66, in Claim 12, before "greater", delete "and m+n is"

In Column 16, Line 66, in Claim 12, delete "eight," and insert --one,-- therefor